(12) United States Patent
Bartlok

(10) Patent No.: US 12,331,890 B2
(45) Date of Patent: Jun. 17, 2025

(54) CRYOGENIC STORAGE SYSTEM

(71) Applicant: MAGNA STEYR Fahrzeugtechnik Gmbh & Co KG, Graz (AT)

(72) Inventor: Guido Bartlok, Graz (AT)

(73) Assignee: MAGNA STEYR Fahrzeugtechnik Gmbh & Co KG, Graz (AT)

( * ) Notice: Subject to any disclaimer, the term of this patent is extended or adjusted under 35 U.S.C. 154(b) by 0 days.

(21) Appl. No.: 18/527,318

(22) Filed: Dec. 3, 2023

(65) Prior Publication Data

US 2024/0240757 A1    Jul. 18, 2024

(30) Foreign Application Priority Data

Jan. 13, 2023    (EP) ..................................... 23151491

(51) Int. Cl.
    *F17C 5/06*    (2006.01)
    *F17C 13/04*   (2006.01)

(52) U.S. Cl.
    CPC ............... *F17C 5/06* (2013.01); *F17C 13/04* (2013.01); *F17C 2221/012* (2013.01); *F17C 2223/0161* (2013.01); *F17C 2250/043* (2013.01)

(58) Field of Classification Search
    CPC ...... F17C 5/06; F17C 13/04; F17C 2221/012; F17C 2223/0161; F17C 2250/043
    USPC .......................................................... 141/18
    See application file for complete search history.

(56) References Cited

U.S. PATENT DOCUMENTS

| | | | | |
|---|---|---|---|---|
| 5,771,946 A | * | 6/1998 | Kooy | ........................ F17C 6/00 141/2 |
| 6,314,947 B1 | * | 11/2001 | Roche | ................ F02M 21/0221 123/527 |
| 6,526,760 B2 | | 3/2003 | Fickel et al. | |
| 11,415,084 B2 | | 8/2022 | Bartlok | |
| 2007/0028628 A1 | * | 2/2007 | Chalk | ..................... F04B 15/08 62/50.7 |
| 2012/0317995 A1 | | 12/2012 | Brunnhofer | |
| 2014/0174106 A1 | * | 6/2014 | Tang | ...................... B64D 37/30 62/50.2 |

(Continued)

FOREIGN PATENT DOCUMENTS

DE          4320556 A1    12/1994
DE    102019205601 A1    10/2020

(Continued)

OTHER PUBLICATIONS

WO 2019091702 A1—English Translation (Year: 2019).*
European Search Report for application No. 23151491.0-1015; mailed on Jun. 16, 2023, 7 pages.

*Primary Examiner* — Craig M Schneider
*Assistant Examiner* — Christopher M Afful
(74) *Attorney, Agent, or Firm* — Jordan IP Law, LLC; Todd A. Vaughn

(57) ABSTRACT

A cryostorage system that includes: a cryocontainer operable to store hydrogen, the cryocontainer having an inner tank and an outer container; at least one cryopump, arranged in the inner tank, to deliver liquid hydrogen and/or gaseous hydrogen in one or more stages via an extraction line to a consumer at a pressure greater than a pressure in the inner tank; and a filling interface to facilitate filling of the inner tank at least in part via the extraction line and a spring-loaded non-return valve into the inner tank.

17 Claims, 3 Drawing Sheets

(56) References Cited

U.S. PATENT DOCUMENTS

2015/0143821 A1* 5/2015 Johnson .................... F17C 7/02
                                                        62/50.6
2023/0073960 A1* 3/2023 Li ............................ F17C 9/00

FOREIGN PATENT DOCUMENTS

EP            3236132 A1    10/2017
WO    WO-2019091702 A1 *  5/2019

* cited by examiner

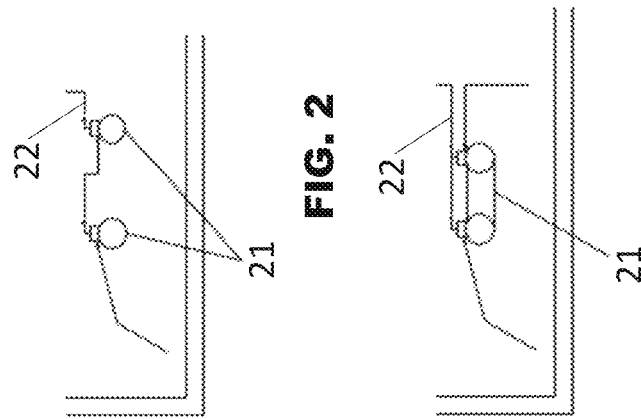
FIG. 2
FIG. 3
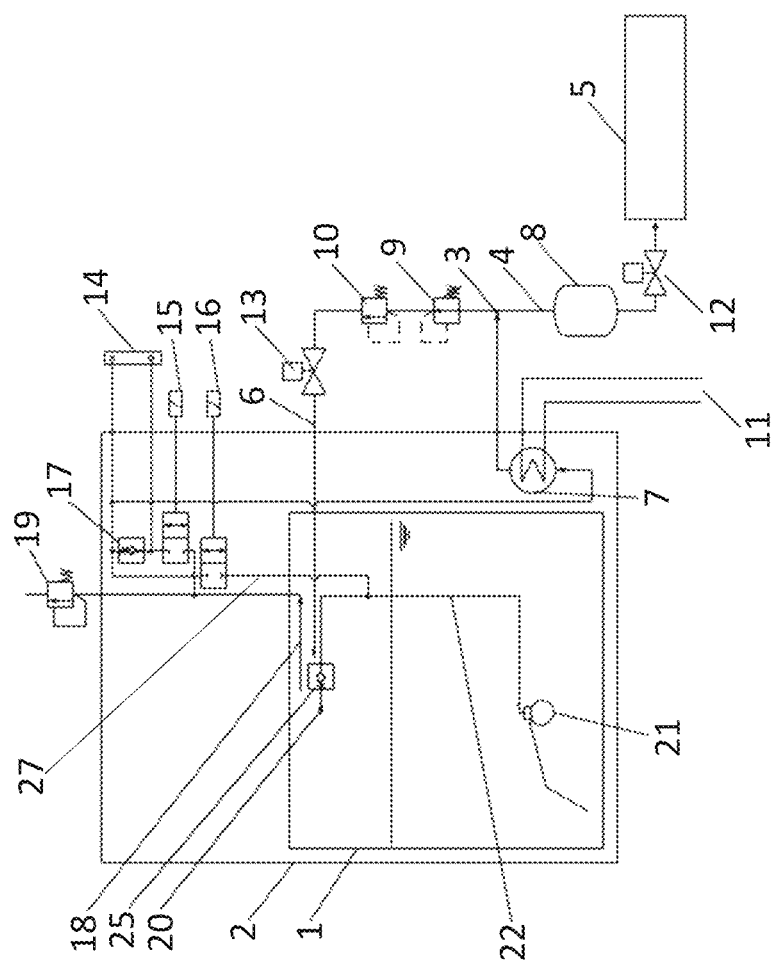
FIG. 1

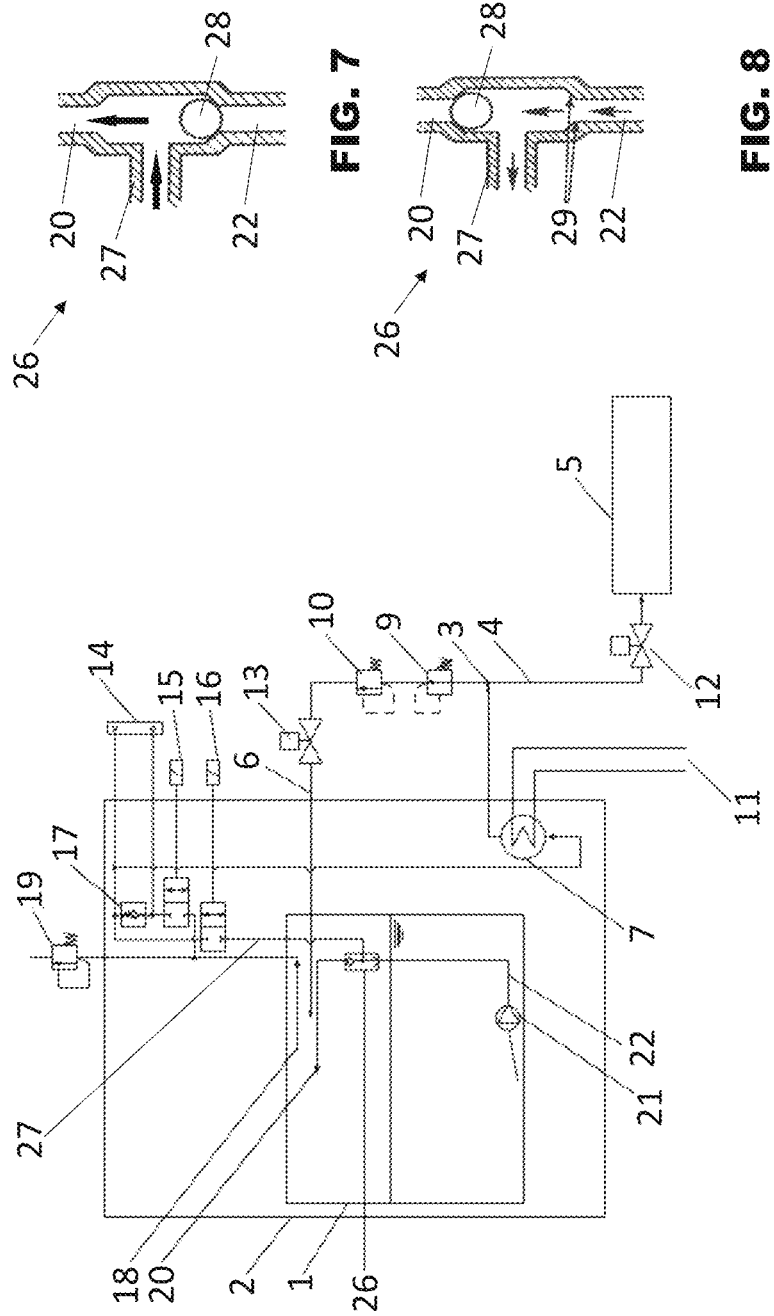

CRYOGENIC STORAGE SYSTEM

CROSS-REFERENCE TO RELATED APPLICATIONS

The present application claims priority 35 U.S.C. § 119 to European Patent Publication No. EP 23151491.0 (filed on Jan. 13, 2023), which is hereby incorporated by reference in its complete entirety.

TECHNICAL FIELD

One or more embodiments of the present disclosure relates to a cryostorage system comprising a cryocontainer for storing hydrogen, in particular, as a mobile cryostorage system for storing hydrogen to power a motor vehicle.

BACKGROUND

It is known that mobile cryostorage systems are used to carry the hydrogen required to provide power in a motor vehicle.

For extraction from the storage container, the pressure in the interior thereof is increased, which is usually done by heating the container content, either with external energy or by a heat exchanger which is arranged in the inner tank of the storage container and through which gas that has already been vaporized flows.

Utility models AT 009 291 U1 and AT 010 015 U1 describe extraction devices which partially overcome the disadvantages associated with the conventional device in that the gaseous gas is returned by a pump and blown into the storage container, either into the gas space or into the liquid near to the bottom.

Alternatively, fluid delivery may be performed by a liquid pump with a linear drive and conditioning via a downstream heat exchanger, as is known from U.S. Patent Publication No. 2012317995A1.

The known solutions, however, have the following disadvantages, for example. In known solutions, the operating pressure in the inner tank must be greater than the supply pressure for the consumer. This reduces the usable storage capacity of the inner container since the density of the liquid gas at very low temperature decreases with an increasing pressure. Moreover, a greater normal working pressure in the inner tank reduces the pressure difference from the response pressure of the boil-off valve, i.e. the pressure build-up time is reduced. Further, with a passive system (closed inner tank heat exchanger), pressure build-up in the inner tank is possible only with simultaneous extraction for the consumer. This means in practice that after the filling—which takes place at a pressure below the operating pressure, only very small amounts of gas can initially be supplied to the consumer. Yet further, in an alternative concept, a so-called active system, a high-power blower is used, which is arranged outside the system and delivers heated hydrogen with a small pressure difference via a pipeline connection into the inner tank, and thereby increases the pressure level thereof independently of simultaneous extraction for the consumer. The blower and the required high-voltage electronics entail power consumptions in the kW range.

SUMMARY

One or more embodiments of the present disclosure provides a cryostorage system of the aforementioned type, which can reduce at least some of the problems mentioned.

In particular, the one or more embodiments provides a cryostorage system comprising a cryocontainer for storing hydrogen, which economically allows a favourable operating pressure in an inner tank and reliable extraction of the medium from the inner tank, as well as reliable filling of the inner tank.

In accordance with the one or more embodiments, a cryostorage system comprises one or more of the following: a cryocontainer for storing hydrogen, having an inner tank and an outer container; at least one cryopump arranged in the inner tank of the cryocontainer, the cryopump operable to deliver liquid hydrogen and/or gaseous hydrogen in one or more stages via an extraction line to a consumer at a pressure greater than the pressure in the inner tank; a filling interface to facilitate filling of the inner tank at least in part via the extraction line and a spring-loaded non-return valve or a shuttle valve into the inner tank.

In accordance with the one or more embodiments, a cryostorage system has at least one cryopump arranged in the inner tank of a cryocontainer. By way of the cryopump, liquid hydrogen and/or gaseous hydrogen can be extracted at very low temperature from the inner tank and preferably supplied to a heat exchanger, which heats the hydrogen and then delivers it further to a consumer. The delivery to the consumer may in this case take place at a pressure which is greater than the pressure in the inner tank of the cryostorage system.

In accordance with the one or more embodiments, the cryopump is arranged in the inner tank of the cryocontainer, i.e., in a region of the cryostorage system which is at very low temperature during normal operation. The cryopump is therefore fully surrounded by cryogenic fluid during normal operation. The drive of the cryopump is adapted to work at very low temperatures.

In accordance with the one or more embodiments, the filling of such a device is carried out via a filling interface, and at least in part via the extraction line, i.e., at least in part via the same line via which hydrogen can be extracted from the inner tank by the cryopump. The filling also taking place via a spring-loaded non-return valve or a shuttle valve into the inner tank. In this way, it is possible to fill the cryostorage system via the extraction line, albeit while circumventing the cryopump in the inner tank.

The following advantages may be achieved by the use of a cryopump in the inner tank: The operating pressure in the inner tank may be minimized and may be less than the lowest possible supply pressure of the consumer. A low operating pressure in the inner tank allows longer pressure build-up times or lower design pressures and therefore smaller wall thicknesses, i.e., lighter inner tanks or more complex storage container geometries may be produced. The back-gas losses during the liquid gas filling may be reduced by the lower inner tank pressure. The improved thermodynamic conditions in the inner tank allow greater filling rates. The change in the delivery level (delivery pressure), or the delivery quantity, is accelerated or facilitated. The energy consumption for the operation of the cryopump, which is entirely exposed to the cryogenic liquid temperature, is much less than for an active system with a blower or with pumps, or compressors, the drive and/or compression work of which is carried out approximately at ambient temperature. With a suitable configuration, liquid and/or gas may selectively be delivered. This allows adaptation between the extraction mass flow and the pressure reduction due to volume work.

In accordance with the one or more embodiments, the spring-loaded non-return valve is arranged in an inlet line into the inner tank, which branches off from a line that is formed by a pressure line taking off the medium delivered by the cryopump and the extraction line.

In accordance with the one or more embodiments, the inlet line into the inner tank is a line which debouches into the inner tank of the cryostorage system, preferentially in the vicinity of the top of the inner tank and/or in a region of the inner tank in which there is usually gaseous hydrogen.

In accordance with a second embodiment in the one or more embodiments, the shuttle valve is arranged in a pressure line (which takes off the delivered medium) of the cryopump. The pressure line which takes off the delivered medium joins at the shuttle valve with an inlet line into the inner tank so that at the shuttle valve, depending on the operating state of the shuttle valve, either the access to the pressure line is opened and the access to the inlet line is closed, or the access to the pressure line is closed and the access to the inlet line is opened.

In accordance with the one or more embodiments, the shuttle valve has an access to the extraction line, which is opened both when access to the pressure line is opened and when access to the inlet line is opened. The shuttle valve therefore has three inputs, namely to the extraction line, to the inlet line and to the pressure line of the cryopump.

In accordance with the one or more embodiments, the shuttle valve has an integrated float, the inherent weight of the float keeping the float in a lower end position during filling so that the inlet line for filling the inner tank is uncovered. When the cryopump is started, the float is raised by the delivery flow so that it blocks the inlet line to the inner tank and the delivery flow is pumped only to the consumer.

In accordance with the one or more embodiments, the cryopump is configured as a linear pump which delivers on both sides.

In accordance with the one or more embodiments, the left and/or right delivery flow of the linear pump is configured selectively to deliver gaseous or liquid hydrogen, preferentially via a check valve near to the pump for switching from $LH_2$ to $GH_2$.

In accordance with the one or more embodiments, the cryocontainer is adapted so that a partial flow of the heated hydrogen, i.e. the extracted hydrogen downstream of a heat exchanger, can be returned via a gas return line into the inner tank in order to increase the inner tank pressure and preferentially maintain it at a minimum pressure. Preferably, a check valve for the gas return to the inner tank is arranged in the gas return line.

In accordance with the one or more embodiments, a pressure reducer, preferentially with a downstream pressure safety valve, is installed in the gas return line for the gas return to the inner tank. In this way, the pressure for the gas return into the inner tank may be limited.

In accordance with the one or more embodiments, a buffer container for heated hydrogen is arranged between the cryopump and the consumer. In this way, it is possible to compensate for a fluctuating delivery power of the cryopump possibly occurring.

DRAWINGS

One or more embodiments of the present disclosure will be illustrated by way of example in the drawings and explained in the description hereinbelow.

FIG. 1 illustrates a schematic representation of a cryostorage system, in accordance with one or more embodiments.

FIG. 2 illustrates a schematic representation of a part of the cryostorage system of FIG. 1, in another alternative embodiment.

FIG. 3 illustrates a schematic representation of a part of the cryostorage system of FIG. 1, in another alternative embodiment.

FIG. 6 illustrates a schematic representation of a cryostorage system, in accordance with another alternative embodiment.

FIG. 7 illustrates a schematic representation of a detail of a shuttle valve of the cryostorage system of FIG. 6 in a first operating state.

FIG. 8 illustrates a schematic representation of a detail of a shuttle valve of a cryostorage system of FIG. 6 in a second operating state.

DESCRIPTION

Figures 4, 5:
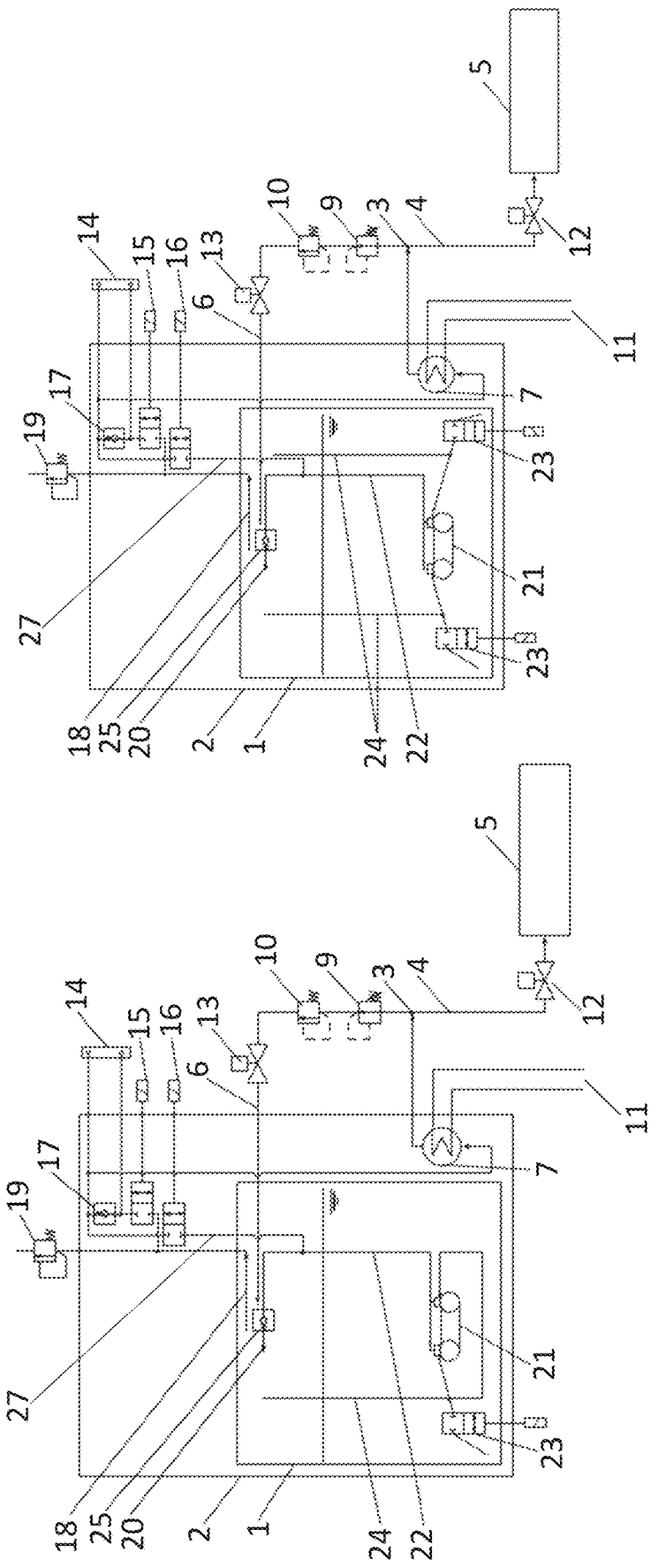
FIG. 4 illustrates a schematic representation of a cryostorage system, in accordance with another alternative embodiment.
FIG. 5 illustrates a schematic representation of a cryostorage system, in accordance with another alternative embodiment.

FIG. 1 represents a cryostorage system in accordance with one or more embodiments, which comprises a cryocontainer that itself comprises an inner tank 1 and an outer container 2, with an insulation space serving as an intermediate space between the inner tank 1 and the outer container 2.

The cryostorage system can deliver cryogenic liquid at very low temperature from the inner tank 1 via a power-controlled pressure-increasing cryopump 21 and a pressure line 22 of the cryopump, which joins with an extraction line 27 and debouches at a line connection 3 into a supply line 4, to a consumer 5.

The cryopump 21 is preferably fully surrounded by cryogenic fluid, i.e. the drive of the pump 21 also works at very low temperatures, which allows a low electrical power consumption for the cold gas compression.

From the inner tank 1 into the extraction line 27, furthermore, gas can flow by opening a $GH_2$ tank valve 15 and/or liquid can flow by opening an $LH_2$ tank valve 16. Gas may in this case be extracted from the inner tank 1 via a combined safety and gas extraction line 18. A non-return valve 17 for the gas extraction may be provided downstream of the $GH_2$ tank valve 15. Gas may also be let out from the combined safety and gas extraction line 18 through a pressure relief safety valve 19.

Downstream of the extraction from the inner tank 1, in particular, downstream of the cryopump 21 and downstream of the tank valves 15, 16, the cryogenic fluid (i.e., liquid hydrogen) is fed through a heat exchanger 7 while being fully converted into the gas phase by supplying heat, preferably via cooling water 11 of the consumer 5, and at the same time heated sufficiently for the consumer 5. The cryopump 21 delivers the hydrogen on demand to the consumer 5 at a greater pressure than in the inner tank 1. The extraction of fuel from the cryostorage system reduces the pressure and the amount of fuel in the inner tank 1 thereof.

In order to compensate for a fluctuating delivery power of the cryopump 21 possibly occurring, a buffer container 8 for heated hydrogen may additionally be arranged between the pump 21 and the consumer 5, particularly in the supply line 4. A check valve 12 for the $H_2$ supply to the consumer 5 may be arranged in the supply line 4 upstream of the consumer 5.

The cryostorage system can be filled via a filling interface 14. The filling may take place in part via the extraction line 27 and an inlet line 20 into the inner tank 1, preferentially into the region of gaseous hydrogen of the inner tank 1.

As represented in FIGS. 1 through 5, a spring-loaded non-return valve 25 may be arranged in the inlet line 20 into the inner tank 1, the inlet line 20 branching off from a line that is formed by a pressure line 22 taking off the medium delivered by the cryopump 21 and the extraction line 27.

The filling may then take place via the extraction line 27 and via the spring-loaded non-return valve 25 and via the inlet line 20 into the inner tank 1.

Should there be a need to increase or maintain the pressure in the inner tank 1 of the cryostorage system, gas may be transferred back into the inner tank 1 via a valve 13 in a gas return line 6, which branches off at the line connection 3 from the extraction line 27 downstream of the heat exchanger 7. In order to limit the pressure for the gas return into the inner tank 1, a pressure reducer 9 with a downstream pressure safety valve 10 may if required be installed in the gas return line 6.

Whereas FIG. 1 shows a one-stage pressure increase with gas return, FIG. 2 illustrates a variant embodiment having a series pump arrangement for a two-stage pressure increase with gas return.

Should there be a need for very high supply pressures (e.g., supercritical, greater than 20 bar), at least one further cryopump stage may be connected in series downstream of the first cryopump stage (cf. FIG. 2). In this case, the final pressure of the first cryopump 21 becomes the intake pressure of the second cryopump 21. The series interconnection allows greater final pressures together with a low energy consumption for the compression of the cold gas. Alternatively, a cryopump 21 and the heat exchanger 7 may also be followed by a heated compressor outside the tank system for the final compression.

FIG. 3 illustrates a particular embodiment of the pump instead of the delivery pump, in the form of a linearly driven cryopump 21 displacing on both sides, having two opposite displacement working spaces each with a separate intake and outlet port for fluid delivery on both sides. The cryopump 21 is therefore configured as a linear pump which delivers the stored medium on both sides, in FIG. 3 only in the form of the liquid medium.

FIG. 4 illustrates an variant embodiment of a linearly driven cryopump 21 displacing on both sides with separate intake ports (as in FIG. 3), but with a check valve 23 on one side (in FIG. 4 on the left side of the linear delivery pump) for the selective delivery of liquid or gas. Only a liquid delivery takes place on the opposite second side of the pump. In other regards, the cryostorage system is configured in the same way as the variants of FIGS. 1 through 3.

By incorporating additional equipment in the inner tank (cryovalve(s), pipeline(s)), gas or liquid may selectively flow to the respective intake port by a controlled alternate valve switching setting. By the valve controller 23, for example, in FIG. 4, the ratio of gas to liquid extraction can be varied and therefore the ratio of mass flow to the consumer 5 to the pressure reduction in the inner tank 1 may therefore also be varied. The possibility of selection between gas or liquid extraction offers an additional degree of freedom since the ratio of mass flow to the consumer 5 to the pressure reduction in the inner tank 1 is therefore no longer approximately constant and the respective quantity may be varied not only via the pump frequency, but in each case flexibly.

When the valve 23 is open, $LH_2$ floods the tube as far as the intake port of the cryopump 21 and the gas extraction line 24 up to the height of the $LH_2$ level (as a consequence of the hydrostatic equilibration). If the valve 23 is closed, firstly the residual $LH_2$ is delivered from the pipeline of the intake port before gaseous hydrogen flows in from above through the gas extraction line 24 to the intake port.

Gas can therefore be extracted from the inner tank 1 via a gas extraction line 24 as an extended intake port of the cryopump 21. Liquid or gas can selectively be delivered from the inner tank 1 by the pump 21 through a check valve 23 near to the pump for switching from $LH_2$ to $GH_2$.

Should a linear pump (FIGS. 3 through 6) which delivers on both sides be used, there are different possible variants for the extraction. The left and right delivery flows may for example both deliver only $LH_2$, i.e. liquid hydrogen, or one of the two sides, for example, the left side, may selectively deliver $GH_2$ or $LH_2$ and the other side may deliver only $LH_2$, or both sides may selectively deliver $GH_2$ or $LH_2$, i.e. gas or liquid, so that the medium delivered is variable overall from 100% $GH_2$ to 100% $LH_2$ delivery.

FIG. 4 illustrates a variant of these possibilities with a linearly driven cryopump 21 displacing on both sides with a connected intake port, with selective delivery of liquid or gas on one side, namely in this case the left side, of the pump.

FIG. 5 illustrates a variant of a linearly driven cryopump 21 displacing on both sides with separate intake ports, both of which are adapted selectively for the delivery of liquid and/or gas. A check valve 23 for switching from $LH_2$ to $GH_2$ is respectively arranged on each of the two intake ports of the cryopump 21.

In the arrangements described in this disclosure, a spring-loaded non-return valve 25 in the filling line in the inner tank in each case allows filling while circumventing the pump 21, and preferentially into the gas space. In this case, for opening the spring-loaded non-return valve 25, it is necessary for the filling pressure to be greater than the maximum delivery pressure of the cryopump 21. Although the non-return valve 25 creates an additional flow resistance for the filling, it avoids one for the delivery flow of the cryopump 21 to the consumer 5.

FIG. 6 illustrates another configuration of the valves for the filling, namely a shuttle valve 26, which is preferentially arranged in the inner tank 1 and is represented in FIG. 6 with a float position for extraction by the cryopump 21. A spring-loaded non-return valve 25 is not necessary in this embodiment. The shuttle valve 26 is arranged in the pressure line 22 of the cryopump 21, which takes off the delivered medium, the pressure line 22 taking off the delivered medium joining, at the shuttle valve 26, with the inlet line 20 into the inner tank 1 so that at the shuttle valve 26, depending on the operating state of the shuttle valve 26, either the access to the pressure line 22 is opened and the access to the inlet line 20 is closed, or the access to the pressure line 22 is closed and the access to the inlet line 20 is opened.

The shuttle valve therefore has an access to the extraction line 27, which is opened both when the access to the pressure line 22 is opened and when the access to the inlet line 20 is opened.

The shuttle valve 26 with an integrated float 28 (cf. FIGS. 6 through 8) represents one embodiment of switching between extraction and filling. The shuttle valve 26 is arranged at the connecting point between the pressure line 22, the extraction line 27 and the inlet line 20 into the inner tank 1.

During filling (FIG. 7), the float 28 remains in the lower end position due to its inherent weight and uncovers the inlet line 20 for filling the inner tank. By starting the cryopump 21, the float 28 is raised/moved by the delivery flow in such a way that it blocks the inlet of the filling line to the inner tank 1, i.e. the inlet line 20 (FIG. 8), so that the delivery flow is pumped only to the consumer 5.

The advantages of this alternative are that the filling can be performed with a lower flow resistance and the filling pressure and maximum delivery pressure of the cryopump 21 are independent of one another. However, the float 28 integrated in the shuttle valve 26 creates an additional flow resistance for the delivery flow of the cryopump 21 to the consumer 5.

Both configurations of the switching function, i.e. a spring-loaded non-return valve 25 and a shuttle valve 26, allow pressure relief of the adjacent lines and of the cryopump 21 into the inner tank 1 when contained fluid expands by heating.

FIG. 7 therefore illustrates the flow in the shuttle valve 26 during filling. The inherent weight of the float 28 keeps the float 28 in a lower end position during filling, so that the inlet line 20 for filling the inner tank 1 is uncovered.

FIG. 8 illustrates the flow in the shuttle valve 26 during extraction via the cryopump 21. When the cryopump 21 is started, the float 28 is raised from the valve seat 29 by the delivery flow, so that it blocks the inlet line 20 to the inner tank 1 and the delivery flow is pumped only to the consumer 5.

The terms "coupled," "attached," or "connected" may be used herein to refer to any type of relationship, direct or indirect, between the components in question, and may apply to electrical, mechanical, fluid, thermal, optical, electromagnetic, electromechanical, or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 inner tank of the primary storage system
2 outer container
3 line connection
4 supply line
5 consumer
6 gas return line
7 heat exchanger
8 buffer container
9 pressure reducer
10 pressure safety valve
11 cooling water circuit
12 check valve for $H_2$ supply to the consumer
13 check valve for gas return to the inner tank
14 interface for filling
15 $GH_2$ tank valve
16 $LH_2$ tank valve
17 non-return valve for the gas extraction
18 combined safety and gas extraction line
19 pressure relief safety valve
20 $LH_2$ inlet line into the inner tank
21 cryopump(s)
22 pressure line of the cryopump
23 check valve close to the pump for switching from $LH_2$ to $GH_2$
24 gas extraction line as extended intake port of the cryopump
25 further non-return valve
26 shuttle valve
27 extraction line
28 float
29 valve seat

What is claimed is:

1. A cryostorage system, comprising:
a cryocontainer operable to store hydrogen, the cryocontainer having an inner tank and an outer container;
at least one cryopump, arranged in the inner tank, to deliver liquid hydrogen and/or gaseous hydrogen in one or more stages via an extraction line to a consumer at a pressure greater than a pressure in the inner tank, wherein the at least one cryopump comprises a linear pump which facilitates a left delivery flow and a right delivery flow on both sides thereof, wherein the left delivery flow and/or the right delivery flow of the linear pump is selectively operable to deliver the gaseous hydrogen or the liquid hydrogen via a check valve, adjacent to the at least one cryopump, for switching from gaseous hydrogen to liquid hydrogen; and
a filling interface to facilitate filling of the inner tank at least in part via the extraction line and a spring-loaded non-return valve arranged in the inner tank.

2. The cryostorage system of claim 1, wherein the spring-loaded non-return valve is arranged in an inlet line into the inner tank, which branches off from a line that is formed by a pressure line taking off the delivered liquid hydrogen and/or gaseous hydrogen by the cryopump and the extraction line.

3. The cryostorage system of claim 1, further comprising a heat exchanger operable to heat the hydrogen.

4. The cryostorage system of claim 3, wherein the cryocontainer is operable such that a partial flow of the heated hydrogen from the heat exchanger, is returned via a gas return line into the inner tank to increase pressure in the inner tank via a check valve for the return of gaseous hydrogen to the inner tank.

5. The cryostorage system of claim 4, further comprising a pressure reducer with a downstream pressure safety valve, arranged in the gas return line for the return gaseous hydrogen to the inner tank.

6. The cryostorage system of claim 1, further comprising a buffer container for heated hydrogen arranged between the cryopump and the consumer.

7. A cryostorage system, comprising:
a cryocontainer operable to store hydrogen, the cryocontainer having an inner tank and an outer container;
at least one cryopump, arranged in the inner tank, to deliver liquid hydrogen and/or gaseous hydrogen in one or more stages via an extraction line to a consumer at a pressure greater than a pressure in the inner tank, the at least one cryopump having a pressure line which takes off delivered liquid hydrogen and/or gaseous hydrogen; and
a filling interface to facilitate filling of the inner tank at least in part via the extraction line and a shuttle valve arranged in the inner tank at the pressure line, wherein the pressure line joins at the shuttle valve with an inlet line into the inner tank so that at the shuttle valve, in an operating state thereof, either access to the pressure line is opened and access to the inlet line is closed, or access to the pressure line is closed and access to the inlet line is opened.

8. The cryostorage system of claim 7, wherein the shuttle valve has an access to the extraction line, which is opened both when access to the pressure line is opened and when access to the inlet line is opened.

9. The cryostorage system of claim 7, wherein the shuttle valve has an integrated float, an inherent weight of the integrated float keeping the float in a lower end position so that the inlet line for filling the inner tank is uncovered.

10. The cryostorage system of claim 9, wherein the integrated float is raised by delivery flow when the cryopump is in an operating state so that it blocks the inlet line to the inner tank and the delivery flow is pumped only to the consumer.

11. The cryostorage system of claim 7, wherein the cryopump comprises a linear pump which facilitates a left delivery flow and a right delivery flow on both sides thereof.

12. The cryostorage system of claim 11, wherein the left delivery flow and/or the right delivery flow of the linear pump is selectively operable to deliver the gaseous hydrogen or the liquid hydrogen via a check valve adjacent to a pump for switching from gaseous hydrogen to liquid hydrogen.

13. The cryostorage system of claim 7, further comprising a heat exchanger operable to heat the hydrogen.

14. The cryostorage system of claim 13, wherein the cryocontainer is operable such that a partial flow of the heated hydrogen from the heat exchanger, is returned via a gas return line into the inner tank to increase pressure in the inner tank via a check valve for the return of gaseous hydrogen to the inner tank.

15. The cryostorage system of claim 14, further comprising a pressure reducer with a downstream pressure safety valve, arranged in the gas return line for the return gaseous hydrogen to the inner tank.

16. The cryostorage system of claim 7, further comprising a buffer container for heated hydrogen arranged between the cryopump and the consumer.

17. A cryostorage system, comprising:
- a cryocontainer having an inner tank operable to store hydrogen;
- an extraction line;
- a cryopump arranged in the inner tank to deliver, via the extraction line, liquid hydrogen and/or gaseous hydrogen in one or more stages at a pressure greater than a pressure in the inner tank, the cryopump operable to facilitate a left delivery flow and a right delivery flow on both sides thereof, wherein the left delivery flow and/or the right delivery flow is selectively operable to deliver the gaseous hydrogen or the liquid hydrogen via a check valve operable to switch from gaseous hydrogen to liquid hydrogen; and
- a filling interface to facilitate filling of the inner tank at least in part via the extraction line and a spring-loaded non-return valve arranged in the inner tank.

* * * * *